United States Patent
Arnett et al.

(10) Patent No.: US 8,676,417 B2
(45) Date of Patent: Mar. 18, 2014

(54) OUTPUT TORQUE MANAGEMENT IN A VEHICLE HAVING AN ELECTRIC POWERTRAIN

(75) Inventors: Michael Arnett, Wixom, MI (US); Alexander K. Rustoni, Oxford, MI (US); Sean W. McGrogan, Ann Arbor, MI (US); Goro Tamai, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 466 days.

(21) Appl. No.: 13/029,381

(22) Filed: Feb. 17, 2011

(65) Prior Publication Data

US 2012/0059539 A1 Mar. 8, 2012

Related U.S. Application Data

(60) Provisional application No. 61/380,354, filed on Sep. 7, 2010.

(51) Int. Cl.
*B60L 11/00* (2006.01)

(52) U.S. Cl.
USPC ............ 701/22; 701/36; 701/48; 701/99; 318/432; 318/433

(58) Field of Classification Search
None
See application file for complete search history.

(56) References Cited

U.S. PATENT DOCUMENTS

| | | | |
|---|---|---|---|
| 5,629,593 A * | 5/1997 | Pollock et al. | 318/432 |
| 5,808,428 A * | 9/1998 | Ito et al. | 318/139 |
| 6,910,990 B2 * | 6/2005 | Doering et al. | 477/110 |
| 7,606,649 B2 * | 10/2009 | Sato | 701/54 |
| 2002/0123409 A1 * | 9/2002 | Suzuki et al. | 477/3 |
| 2003/0034187 A1 * | 2/2003 | Hisada et al. | 180/65.1 |
| 2004/0259684 A1 * | 12/2004 | Kresse et al. | 477/115 |
| 2005/0000479 A1 * | 1/2005 | Niki et al. | 123/90.15 |
| 2005/0103544 A1 * | 5/2005 | Takami et al. | 180/65.2 |
| 2005/0256623 A1 * | 11/2005 | Hubbard et al. | 701/54 |
| 2006/0175997 A1 * | 8/2006 | Hommi et al. | 318/432 |
| 2007/0112496 A1 * | 5/2007 | Ji | 701/70 |
| 2009/0236160 A1 * | 9/2009 | Tanaka et al. | 180/65.265 |
| 2010/0026222 A1 * | 2/2010 | Yoshida et al. | 318/400.22 |
| 2010/0071975 A1 * | 3/2010 | Aoki | 180/65.285 |
| 2010/0201293 A1 * | 8/2010 | Yoshida et al. | 318/139 |
| 2010/0234174 A1 * | 9/2010 | Miyazaki et al. | 477/5 |
| 2011/0046829 A1 * | 2/2011 | Tamai et al. | 701/22 |
| 2011/0125352 A1 * | 5/2011 | McGrogan et al. | 701/22 |

FOREIGN PATENT DOCUMENTS

DE 102004046194 A1 6/2005

* cited by examiner

*Primary Examiner* — Jonathan M Dager
(74) *Attorney, Agent, or Firm* — Quinn Law Group, PLLC

(57) ABSTRACT

A method for managing a threshold increase in output torque capability in a vehicle includes detecting the threshold increase in output torque capability using a controller, and automatically limiting, via the controller, a rate of change of an actual output torque from a transmission of the vehicle in response to the threshold increase. The actual output torque is provided via a traction motor solely using battery power from an energy storage system. The method may include calculating a difference between the threshold increase and the actual output torque, and limiting the rate of change using a rate that is proportional to the difference. A vehicle includes the ESS, a transmission, and a controller. An output member of the transmission is powered using electrical energy from the ESS. The controller manages an increase in output torque capability as noted above.

14 Claims, 2 Drawing Sheets

OUTPUT TORQUE MANAGEMENT IN A VEHICLE HAVING AN ELECTRIC POWERTRAIN

CROSS-REFERENCE TO RELATED APPLICATIONS

This application claims priority to and the benefit of U.S. Provisional Patent Application No. 61/380,354, filed on Sep. 7, 2010, which is hereby incorporated by reference in its entirety.

TECHNICAL FIELD

The present invention relates to the management of output torque in a vehicle having an electric powertrain.

BACKGROUND

Battery Electric Vehicles (BEV), Extended Range Electric Vehicles (EREV), and Hybrid Electric Vehicles (HEV) can be powered in at least one electric-only propulsion mode, i.e., an electric vehicle (EV) mode. One or more high-voltage traction motors provide motor torque sufficient for powering the vehicle in such a mode. Each traction motor is energized via battery power supplied by a high-voltage energy storage system (ESS). The ESS can be recharged as needed during vehicle operation, such as during regenerative braking. The ESS may also be recharged when the vehicle is not running by connecting the ESS to an offboard power supply. When a state of charge of the ESS is largely depleted in an EREV, a small internal combustion engine can be automatically started and used to power an electric generator. The power output from the generator provides the required electrical energy for sustaining the EV mode.

Vehicle powertrains include a transmission that transfers motor torque from a driven member of the traction motor to an output member of the transmission. The actual output torque operating on the output member ultimately powers a set of drive wheels to propel the vehicle. Shift times in such transmissions can be relatively lengthy. Additionally, the output torque capacity or capability in a vehicle having an EV powertrain may suddenly and perceptibly increase, for example when available battery power suddenly increases.

SUMMARY

A method is disclosed herein for managing a sudden increase in output torque capability in a vehicle having an electric vehicle (EV) powertrain. Execution of the present method helps ensure that the sudden increase in torque capability is imperceptible by a driver of the vehicle. The method includes slowing a rate of change of an actual output torque that is transmitted to the output member of the transmission once increased torque capability is realized. This occurs during a predetermined vehicle condition, e.g., during a substantially constant requested output torque period as determined by processing position signals from an accelerator pedal. Torque sag is effectively eliminated while shift time is reduced. Increased battery power can be utilized to accomplish a more rapid shift, and with minimal perturbation of output torque.

The present method may be embodied as an algorithm or code, recorded on a computer-readable/non-transitory medium, and automatically executed by associated hardware components of an onboard controller. The controller detects a threshold sudden increase in output torque capability. This may entail automatically comparing the current output torque capability to an average value of a number of previous samples. The controller may set a flag indicating a threshold sudden increase in output torque capability when the current value exceeds the average value by a calibrated amount. The controller automatically limits the rate of change in actual output torque when the increase is detected, doing so in one embodiment as a function of accelerator pedal position.

For example, a slower rate limit may be applied if the accelerator pedal position is held fairly constant over a calibrated interval. The rate limit may increase in conjunction with an increasing difference between output torque capability and the actual output torque. In one embodiment, shift times can be decreased by automatically lowering an engine speed target value via the controller during the shift event while simultaneously increasing the short term rate limit.

In particular, a method is provided for managing a sudden increase in output torque capability in a vehicle having a controller, a transmission, and a traction motor powered via battery power from an energy storage system (ESS). The method includes detecting, via the controller, a threshold increase in output torque capability, and automatically limiting the rate of change of an actual output torque from the transmission in response to the threshold increase. The actual output torque is provided via the traction motor solely using the battery power from the ESS.

The method may include calculating a difference between the threshold increase and the actual output torque, and limiting the rate of change using a rate that is proportional to the difference. Detecting the threshold increase in output torque capability may include evaluating a difference between an instantaneous derivative of the actual output torque and an average of a calibrated number of prior output torque derivative values.

In one embodiment, the controller measures a position of an accelerator pedal of the vehicle using a pedal sensor, and the method includes limiting the rate of change of the actual output torque as a function of the position of the accelerator pedal. The method may also include measuring an interval of elapsed time that the accelerator pedal has been held in a substantially constant position, and automatically limiting the rate of change of the actual output torque when the amount of elapsed time exceeds a calibrated time threshold.

A vehicle includes an ESS for providing battery power, a traction motor driven by the battery power from the ESS, a transmission having an output member, and a controller. The output member is driven via the traction motor using battery power from the ESS. The controller is configured for detecting a threshold increase in output torque capability, and automatically limiting the rate of change of an actual output torque from the transmission in response to the threshold increase.

The above features and advantages and other features and advantages of the present invention are readily apparent from the following detailed description of the best modes for carrying out the invention when taken in connection with the accompanying drawings.

DESCRIPTION

Figure 1:
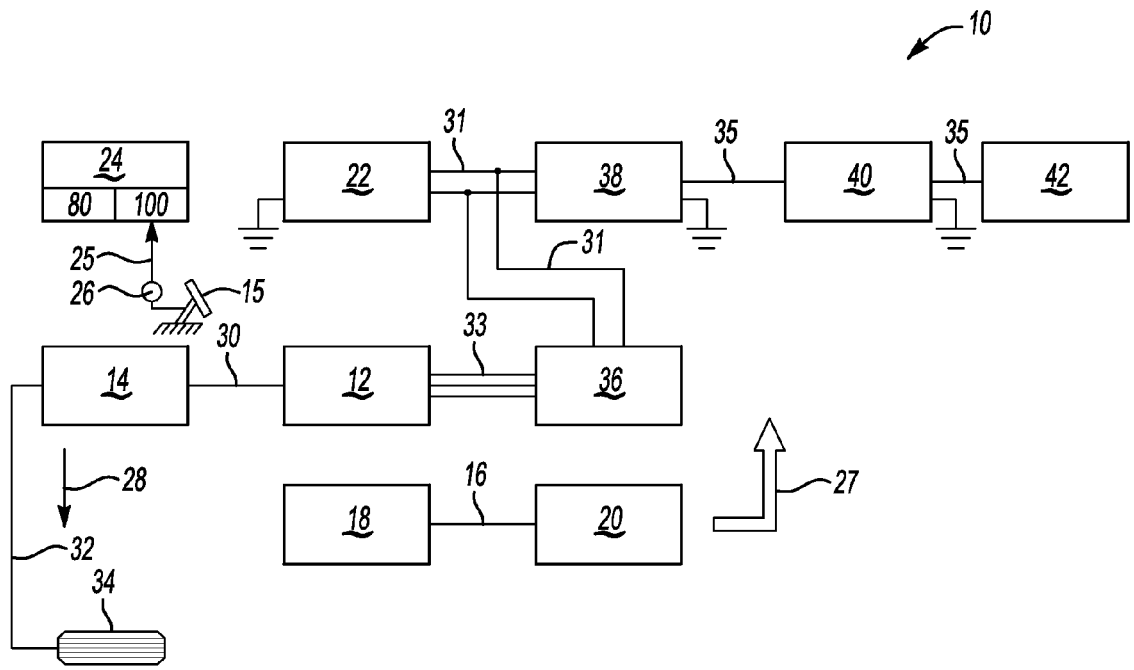
FIG. 1 is a schematic illustration of a vehicle having an electric vehicle (EV) powertrain and a controller that manages a threshold sudden increase in output torque capability.
Figure 3:
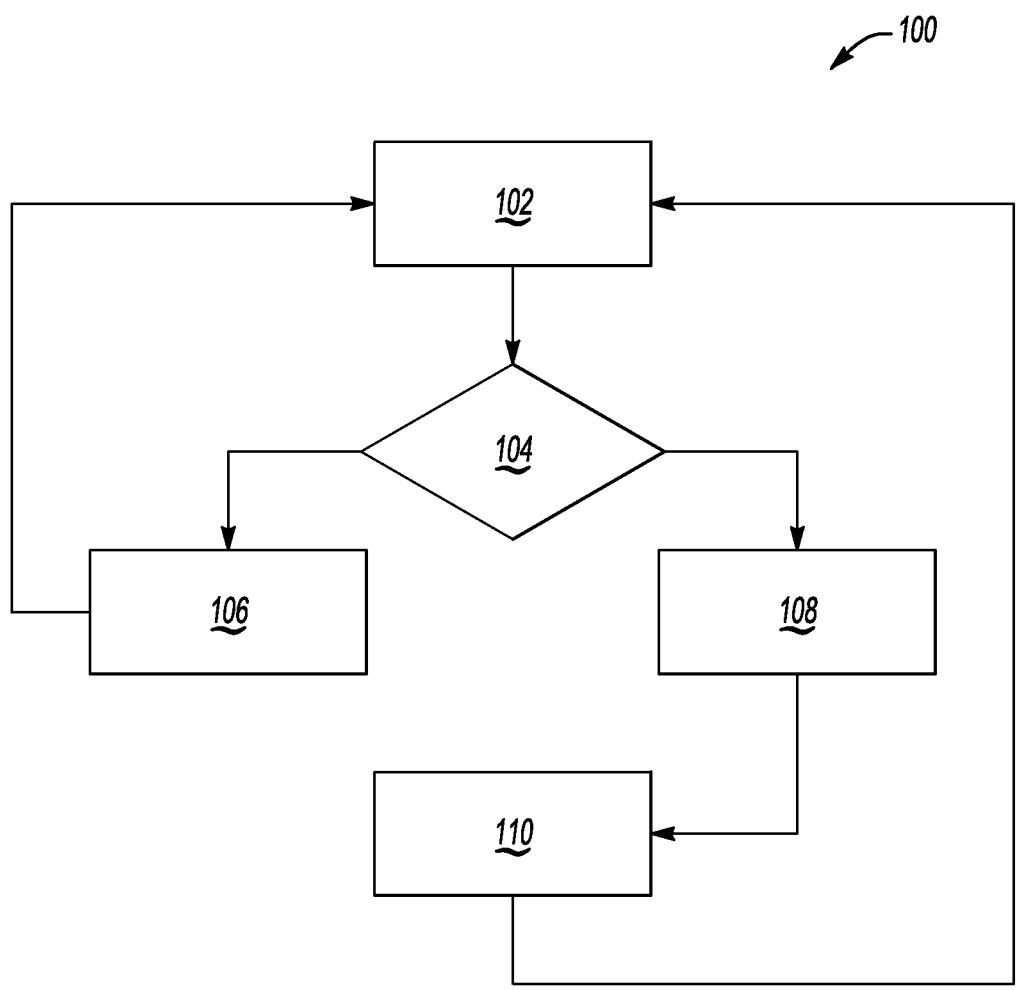
FIG. 3 is a flow chart describing a method for managing a threshold sudden increase in output torque capability in the vehicle shown in FIG. 1.

Referring to the drawings, a vehicle 10 is shown schematically in FIG. 1. The vehicle 10 includes a controller 24 configured for executing a method 100, an embodiment of which is shown in FIG. 3 and described in detail below. The vehicle 10 is any vehicle having an electric vehicle (EV) powertrain, e.g., a Battery Electric Vehicle (BEV), an Extended Range Electric Vehicle (EREV), a Hybrid Electric Vehicle (HEV), or any other vehicle capable of being propelled in an EV propulsion mode, i.e., using electric motor torque alone. The controller 24 automatically manages a sudden increase in output torque capability aboard the vehicle 10 by controlling a rate of change of actual output torque when increased output torque capability is realized.

A high-voltage electric traction motor 12 delivers motor torque to a transmission 14, and thereby powers the vehicle 10 in the EV propulsion mode. An internal combustion engine 18 may be included, which can be used to power the transmission 14 in an HEV design. An engine 18 of reduced size in the embodiment shown can be used to power an electric generator 20 in the EREV embodiment shown in FIG. 1. For example, a crankshaft 16 of the engine 18 may be rotated when additional electrical power is required above a level provided solely by an energy storage system (ESS) 22. The additional electrical power is indicated in FIG. 1 by arrow 27. When a state of charge of the ESS 22 exceeds a calibrated threshold, the engine 18 can be turned off to conserve fuel. The vehicle 10 thereafter can be powered in the EV mode, which may include multiple EV modes depending on the transmission design.

The controller 24 can be programmed with the code or instructions needed for executing the present method 100. Such instructions can be stored on a computer-readable, non-transitory storage medium and selectively executed by associated hardware components of the controller 24, e.g., a host machine or machines configured as set forth below. The controller 24 automatically determines precisely when and how to manage an increase in output torque capability. Operating conditions considered by the controller 24 may include a measured or detected position of an accelerator pedal 15 in one possible embodiment. For example, the position of accelerator pedal 15 can be automatically sensed by a pedal sensor 26, with the measured pedal position communicated to the controller 24 as a pedal position signal (arrow 25) to determine a driver-intended output torque request.

The controller 24 selectively controls a rate of change of an actual output torque, a value which is represented in FIG. 1 by arrow 28. Ordinarily this means a reduction in the rate of change so as to render the change as imperceptible as possible to a driver of the vehicle 10. Such rate limiting functionality is automatically applied by the controller 24 when a threshold change in output torque capability is detected. Operation of the controller 24 thus eliminates torque sag while shortening shift time of the transmission 14. Additionally, the reduction in shift time can improve overall fuel economy and vehicle drive quality.

Still referring to FIG. 1, the transmission 14 has an input member 30 and an output member 32. The transmission 14 may be configured as an electrically-variable transmission (EVT) or any other suitable transmission capable of transmitting torque to a set of drive wheels 34 via the output member 32. The output member 32 delivers the actual output torque (arrow 28) in response to a speed request from a driver of vehicle 10, which is ultimately determined by the controller 24 by any suitable means, e.g., by processing the pedal position signals (arrow 25) communicated via the pedal position sensor 26 as noted above.

The traction motor 12 may be configured as a multi-phase electric machine of approximately 60VAC to approximately 300VAC or more depending on the required design. While one traction motor 12 is shown for simplicity, additional traction motors may be used depending on the vehicle design. Each traction motor 12 may be electrically connected to the ESS 22 via a high-voltage AC bus 33, a traction power inverter module (TPIM) 36, and a high-voltage DC bus 31. The ESS 22 may be selectively recharged during a regenerative braking or other regenerative event. An auxiliary power module (APM) 38, e.g., a DC-DC power converter or other suitable device, may be electrically connected to the ESS 22 via the DC bus 31. In turn, the APM 38 may be electrically connected to an auxiliary battery 40, e.g., a 12-volt DC battery, via a low-voltage DC bus 35, with the APM energizing one or more auxiliary systems 42 such as a radio, headlights, wipers, etc.

The controller 24 may be a single control device or a distributed and networked control device that is electrically connected to or otherwise placed in electrical communication with the engine 18, the traction motor 12, the ESS 22, the APM 40, the TPIM 36, and the auxiliary battery 40 via suitable control channels. Such control channels may include any required transfer conductors providing a hard-wired or wireless control link suitable for transmitting and receiving the necessary electrical control signals for proper power flow control and coordination aboard the vehicle 10. The controller 24 may include such additional control modules and capabilities as might be necessary to execute the required power flow control functionality aboard vehicle 10 in the desired manner.

The controller 24 shown in FIG. 1 may be configured as a digital computer hardware device connected with respect to the various powertrain components of vehicle 10 so as to provide proportional-integral-derivative (PID) control functionality. Controller 24 has a microprocessor or central processing unit, read only memory (ROM), random access memory (RAM), electrically-erasable programmable read only memory (EEPROM), a high-speed clock, analog-to-digital (A/D) and/or digital-to-analog (D/A) converter circuitry, and input/output circuitry and devices (I/O), as well as appropriate signal conditioning and buffer circuitry. Any algorithms and reference tables resident in the controller 24 or accessible thereby, including any algorithms needed for executing the present method 100 and a rate limit table 80 as described below with reference to FIG. 3, can be stored on computer-readable, non-transitory media and, as noted above, automatically executed by the hardware components of the controller 24, e.g., a host machine, in order to provide the respective functionality.

Figure 2:
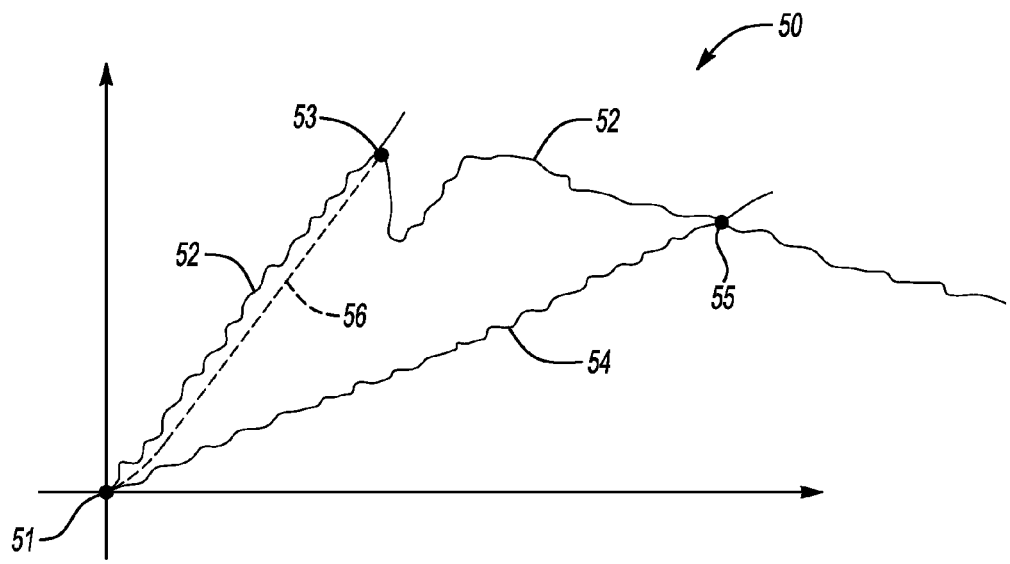
FIG. 2 is a time plot of various torque measurements for the vehicle shown in FIG. 1.

Referring to FIG. 2, a time plot 50 includes traces 52, 54, and 56, with time represented via the horizontal axis. Trace 52 represents one example of a threshold sudden change in output torque capability. Traces 54 and 56 represent actual output torque. Of these, trace 54 represents the actual output torque as it is managed by the controller 24. Trace 54 rises from the origin at point 51 and intersects trace 52 at point 55. Trace 56 represents the rise in actual output torque absent execution of the present method 100, with trace 56 rapidly rising to intersect trace 52 at point 53. By automatically rate-limiting the actual output torque as set forth herein to provide trace 54, the controller 24 of FIG. 1 avoids a sudden increase of the type illustrated by trace 56. Such a pronounced increase may be felt by a driver under some circumstances, which may degrade the overall drive feel and fuel economy.

Increasing available battery power from the ESS 22 can decrease the amount of time required for completing a shift event aboard the vehicle 10 shown in FIG. 1. However, it is recognized herein that the additional torque capability provided by increased battery power should not be realized in the actual output torque domain. The controller 24 therefore determines when to apply a special rate limit to control the rate of change of the actual output torque, e.g., during a shift event or a period of relatively steady output torque request. This is a first phase of torque management provided by the controller 24.

A second phase of torque management further recognizes that a decreased shift time may be enjoyed during periods of relatively low battery power, provided that an engine speed target is decreased and the battery power limits of the ESS 22 are temporarily increased in a vehicle so equipped, e.g., a hybrid electric vehicle. A set of calibration tables, e.g., the rate limit table 80 shown in FIG. 1 or another suitable lookup table or multiple such tables, may be used to modify the engine speed target during a shift event, with the table 80 being indexed by battery power. That is, the lower the battery power, the lower the engine speed time target, a relationship which results in a faster shift time. In this manner, the controller 24 not only manages shift times as noted above, but also manages a sudden increase in output torque capability regardless of the reason for the increase. In those powertrains configured without an engine, boosting of the battery power limits temporarily during a shift alone is sufficient to decrease shift time while not allowing output torque to increase.

Referring to FIG. 3 in conjunction with the structure of the vehicle 10 shown in FIG. 1, method 100 begins with step 102. At step 102, the controller 24 filters an output torque request from the driver as entered via the accelerator pedal 15 and the pedal position signals (arrow 25). A maximum torque constraint is the maximum amount of output torque that can be delivered by the powertrain given battery power limits, clutch torque limits, and motor limits. This value is first calculated, and then it is filtered. For example, step 102 may entail passing these values through a low-pass and/or a high-pass filter to eliminate initial extraneous noise.

The controller 24 can then process the filtered results through a first order derivative operation. As is understood in the art, the derivative control term of any three-term PID controller, i.e., the controller 24, determines a proper correction action to apply based on the rate of change of the error as determined using the proportional (P) and integral (I) terms. The controller 24 then filters the output again to remove noise from the derivative operation. The filtered output torque derivative value may be recorded in a circular array or buffer having a calibrated number of data positions. This allows the calibrated number of prior output torque derivative values to be retained for use as indicated below.

At step 104, the controller 24 determines if a threshold sudden increase is present in output torque capability by processing a set of predetermined vehicle operating values. For example, a sudden increase in output torque capability can be determined by evaluating a difference between the instantaneous output torque derivative and an average of the calibrated number of prior output torque derivative values. When this difference exceeds a threshold calibration, e.g., four or more prior values in one possible embodiment, the sudden increase may be determined to be present.

Step 104 may further include timing a duration that accelerator pedal 15 is held with respect to a particular position. This can help ensure that any transient response causing a large derivative value does not trip the rate limiting logic of method 100, and thereby inadvertently apply rate limiting when it is not necessary.

When the controller 24 determines that a threshold sudden increase in torque capability is present, the method 100 proceeds to step 108, and alternatively proceeds to step 106 when the sudden increase is not present. At step 108, the controller 24 can set a Boolean flag or value to TRUE. A TRUE flag or equivalent value signals that rate limiting of the actual output torque is to be applied, and the method 100 proceeds to step 110. Conversely, a FALSE flag set at step 106 signals that rate limiting is not to be applied, with the method 100 repeating step 102 whenever the flag is FALSE.

At step 110, rate limiting is applied and remains applied until the Boolean flag described above becomes FALSE. That is, once the flag becomes TRUE, it will remain TRUE until the output torque capability is once again within a calibrated range of the actual output torque, e.g., point 55 of FIG. 2. A simple finite state machine or other suitable means can be used to accomplish this result. The controller 24 can rate limit the increase in actual output torque by an amount that is inversely proportional to the time that has elapsed since a driver increased the output torque request as signaled via the accelerator pedal 15.

The rate limit lookup table 80 shown in FIG. 1 and applied as explained above is therefore a function of two different inputs: the difference between the rate limited output torque and the actual output torque, and the length of time that the accelerator pedal 15 remains in a substantially constant position. Accounting for the difference between the rate limited output torque and the actual output torque request allows for the rate limit to be set at a relatively fast rate when the difference is larger than a threshold difference. Likewise, the rate limit may be set at a relatively slow rate when the difference is smaller than the threshold difference.

By factoring in the length of time that the accelerator pedal 15 of FIG. 1 has been held in a substantially constant position ensures that when a driver of the vehicle 10 shown in FIG. 1 has held a fairly constant pedal position for a sufficient length of time, the controller 24 can ensure that the output torque rate limit will not change even while output torque constraints are changing. This in turn ensures that drive quality of the vehicle 10 is not degraded.

In order to determine how long the accelerator pedal 15 has been held in a constant position, the average of a previous set of pedal positions may be compared to the instantaneous pedal position, e.g., the previous twenty or more positions in one possible embodiment. If these two values differ by less than a calibrated amount, the position of accelerator pedal 15 can be considered to be substantially constant, and the timer noted above can be started. The timer can be reset by the controller 24 when the pedal position of accelerator pedal 15 is no longer constant.

In one embodiment, an additional calibration may be included that accounts for the severity of the change in pedal position. For example, consider a scenario in which a threshold calibration is set to 10% of a maximum torque capability, i.e., a pedal position change of greater than the 10% level will reset the timer and cause the rate limit to be relatively fast. Without any additional logic, when the driver has maintained the accelerator pedal 15 at a fairly constant position before tip-in of an additional 9% torque request, the rate limit will still be slow and will not change. When the driver tips-out that same 9% torque request and then tips-in to 11%, the driver has not displaced the accelerator pedal 15 noticeably more than was done in the previous maneuver, i.e., from the perspective of the driver. However, the timer resets and causes the rate limit to speed up significantly.

The timer calibration thus decreases the time being sent to the rate limit table 80 of controller 24 based on the change in position of the accelerator pedal 15. If the driver performs the same maneuver with this calibration in place, tip-in to 9% of torque capability will not force the timer to reset, but rather the calibration time table will subtract time from the value being sent to the rate limit table, thus slightly speeding up the rate limiting. When the same driver tips out and then tips-in at the 11% level, the increase in the rate limiting will be proportional to the previous maneuver. Finally, the time input to the rate limit table is saturated by a calibration to ensure the time doesn't continually increase to a point beyond the table.

While the best modes for carrying out the invention have been described in detail, those familiar with the art to which this invention relates will recognize various alternative designs and embodiments for practicing the invention within the scope of the appended claims.

The invention claimed is:

1. A method for managing a threshold increase in output torque capability in a vehicle having a transmission and an accelerator pedal, the method comprising:
measuring a position of the accelerator pedal using a pedal sensor;
measuring an interval of elapsed time over which the measured position of the accelerator pedal is substantially constant;
detecting the threshold increase in output torque capability using a controller; and
automatically limiting, via the controller, a rate of change of an actual output torque from the transmission of the vehicle as a function of the measured position of the accelerator pedal in response to the detected threshold increase, wherein automatically limiting the rate of change occurs only when the interval of elapsed time exceeds a calibrated time threshold;
wherein the actual output torque is provided via a traction motor solely using battery power from an energy storage system.

2. The method of claim 1, further comprising:
calculating a difference between the threshold increase and the actual output torque; and
limiting the rate of change using a rate that is proportional to the difference.

3. The method of claim 1, wherein detecting the threshold increase includes evaluating a difference between a current value of the actual output torque and an average of a calibrated number of prior values of the actual output torque.

4. The method of claim 1, wherein limiting the rate of change includes limiting the rate by an amount that is inversely proportional to the interval of elapsed time.

5. The method of claim 1, wherein automatically limiting the rate includes applying a rate limit from a lookup table indexed by the battery power.

6. The method of claim 1, further comprising:
filtering an output torque request from a driver of the vehicle via the controller through one of a high-pass and a low-pass filter; and
processing the filtered request through a first order derivative operation using a proportional-integral-derivative control function of the controller.

7. A vehicle comprising:
an electrical storage system (ESS);
a traction motor energized using battery power from the ESS;
a transmission having an output member, wherein the output member is driven via the traction motor; and
a controller configured to:
detect a threshold increase in output torque capability of the transmission; and
automatically limit the rate of change of an actual output torque from the transmission in response to the threshold increase;
wherein the controller is configured to detect the threshold increase in output torque by evaluating a difference between a current value of the actual output torque and an average of a calibrated number of prior values of the actual output torque.

8. The vehicle of claim 7, wherein the controller is further configured to:
calculate a difference between the threshold increase and the actual output torque; and
limit the rate of change using a rate that is proportional to the difference.

9. The vehicle of claim 7, further comprising an accelerator pedal and a pedal sensor, wherein the controller is further configured to:
measure a position of the accelerator pedal using the pedal sensor; and
limit the rate of change of the actual output torque as a function of the position of the accelerator pedal.

10. The vehicle of claim 9, wherein the controller is further configured to:
measure an interval of elapsed time over which the accelerator pedal has been held in a substantially constant position; and
automatically limit the rate of change of the actual output torque when the amount of elapsed time exceeds a calibrated time threshold.

11. The vehicle of claim 10, wherein the controller limits the rate of change by an amount that is inversely proportional to the interval of elapsed time.

12. The vehicle of claim 7, wherein the controller is configured to automatically limit the rate of increase by accessing and applying a rate limit from a lookup table indexed by the battery power.

13. The vehicle of claim 7, wherein the controller is further configured to:
filter an output torque request from a driver of the vehicle through one of a high-pass and a low-pass filter; and
process the filtered request through a first order derivative operation.

14. A method for managing a threshold increase in output torque capability in a vehicle, the method comprising:
detecting the threshold increase in output torque capability using a controller, including evaluating a difference between a current value of an actual output torque and an average of a calibrated number of prior values of the actual output torque; and
using the controller to automatically limit, in response to the threshold increase, a rate of change of an actual output torque from a transmission of the vehicle, including referencing a lookup table indexed by battery power from an energy storage system;
wherein the actual output torque is provided via a traction motor solely using the battery power.

* * * * *